(12) United States Patent
Makino et al.

(10) Patent No.: US 11,936,428 B2
(45) Date of Patent: Mar. 19, 2024

(54) OPTICAL DEVICE AND OPTICAL COMMUNICATION APPARATUS

(71) Applicant: Fujitsu Optical Components Limited, Kawasaki (JP)

(72) Inventors: Shuntaro Makino, Kawasaki (JP); Teruo Kurahashi, Isehara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 8 days.

(21) Appl. No.: 17/946,669

(22) Filed: Sep. 16, 2022

(65) Prior Publication Data

US 2023/0141163 A1 May 11, 2023

(30) Foreign Application Priority Data

Nov. 9, 2021 (JP) .................. 2021-182515

(51) Int. Cl.
*H04B 10/00* (2013.01)
*H04B 10/25* (2013.01)
*H04J 14/00* (2006.01)

(52) U.S. Cl.
CPC .................. *H04B 10/25* (2013.01)

(58) Field of Classification Search
CPC . G02B 2006/1204; G02F 1/03; G02F 1/0305; G02F 1/0311; G02F 1/095
See application file for complete search history.

(56) References Cited

U.S. PATENT DOCUMENTS 7,970,241 B2 6/2011 Chen et al.
2008/0019651 A1* 1/2008 Sugiyama ............ G02B 6/1342
385/129
2009/0310906 A1* 12/2009 Miyatake ................ G02F 1/035
250/492.1

FOREIGN PATENT DOCUMENTS

JP 2017-156454 A 9/2017

* cited by examiner

*Primary Examiner* — Daniel G Dobson
(74) *Attorney, Agent, or Firm* — STAAS & HALSEY LLP

(57) ABSTRACT

An optical device includes an electro-optic crystal layer, a first optical waveguide formed in the electro-optic crystal layer, and an electrode that applies an electric signal to the first optical waveguide. Further, the optical device includes a second optical waveguide in an amorphous state formed in the electro-optic crystal layer and connected to the first optical waveguide.

14 Claims, 10 Drawing Sheets

OPTICAL DEVICE AND OPTICAL COMMUNICATION APPARATUS

CROSS-REFERENCE TO RELATED APPLICATION

This application is based upon and claims the benefit of priority of the prior Japanese Patent Application No. 2021-182515, filed on Nov. 9, 2021, the entire contents of which are incorporated herein by reference.

FIELD

The embodiments discussed herein are related to an optical device and an optical communication apparatus.

BACKGROUND

For example, in an optical device such as an optical modulator, a signal electrode is disposed over an optical waveguide on a surface thereof. When a voltage is applied to the signal electrode, an electric field is generated in the optical waveguide in a direction perpendicular to the surface of the optical modulator. The electric field changes a refractive index of the optical waveguide, resulting in a change in phase of light propagating through the optical waveguide, making it possible to modulate the light. That is, the optical waveguide of the optical modulator constitutes, for example, a Mach-Zehnder interferometer, and it is possible to output an IQ signal that is, for example, XY-polarization multiplexed due to a difference in phase of light between a plurality of optical waveguides arranged in parallel with each other.

FIG. 7 is a schematic plan view illustrating an example of a configuration of an optical modulator 100, and FIG. 8 is a schematic cross-sectional view illustrating an example of a cross-sectional portion taken along line E-E illustrated in FIG. 7. The optical modulator 100 illustrated in FIG. 7 includes an input unit 101, a branching unit 102, two optical waveguides 103, an electrode unit 104, a multiplexing unit 105, and an output unit 106. Note that a length direction of the optical modulator 100 is defined as a Y direction, a width direction of the optical modulator 100 is defined as a Z direction, and a thickness direction of the optical modulator 100 is defined as an X direction.

The input unit 101 receives light from an optical fiber. The branching unit 102 branches the light from the input unit 101. The two optical waveguides 103 are optical waveguides that are arranged in parallel with each other to each modulate the light branched by the branching unit 102. The electrode unit 104 is an electrode that applies an electric signal to the two optical waveguides 103. The electrode unit 104 includes a pair of ground electrodes 104B and a signal electrode 104A disposed to be sandwiched between the pair of ground electrodes 104B. The signal electrode 104A is an electrode that applies an electric signal to the optical waveguides 103. The ground electrodes 104B are electrodes that ground the electric signal applied to the optical waveguides 103, respectively. The optical waveguides 103 constitute a Mach-Zehnder (MZ) interaction unit that modulates light by changing a light refractive index according to the electric signal from the signal electrode 104A so as to change a phase of the light. Then, each of the optical waveguides 103 outputs the modulated light to the multiplexing unit 105. The multiplexing unit 105 multiplexes the modulated light from the optical waveguides 103. The output unit 106 outputs the modulated light from the multiplexing unit 105 to the optical fiber.

The optical modulator 100 illustrated in FIG. 8 includes a substrate 111, an intermediate layer 112 laminated on the substrate 111, and a thin film LN layer 113 laminated on the intermediate layer 112 and made of an LN material ($LiNbO_3$). Further, the optical modulator 100 includes two optical waveguides 103 formed in the thin film LN layer 113, a buffer layer 114 formed on the thin film LN layer 113, and an electrode unit 104 formed on the buffer layer 114.

For example, the substrate 111 is a substrate made of Si, LN, or the like. The intermediate layer 112 is a layer having a lower light refractive index than LN, for example, $SiO_2$. The thin film LN layer 113 is a thin film substrate that is advantageous in size reduction because it is strong in terms of confinement of light. Note that the crystal axis of the thin film LN layer 113 is the Z direction.

Since the optical waveguides 103 are formed in the thin film LN layer 113, they are superior, for example, in terms of insertion loss and transmission characteristics. Since the thin film LN layer 113 is an X-cut substrate, structural symmetry is suitable for long-distance transmission while enabling chirp-free operation. The optical waveguides 103 are disposed between the ground electrodes 104B and the signal electrode 104A, respectively. The signal electrode 104A is, for example, an electrode of a metal material such as gold or copper. The ground electrode 104B is, for example, an electrode of a metal material such as gold or copper. The buffer layer 114 is, for example, a $SiO_2$ layer provided to prevent light propagating on the optical waveguides 103 from being absorbed into the electrode unit 104.

The crystal direction in which the electro-optical effect of the thin film LN layer 113 is most strongly exhibited is the width direction (Z direction) orthogonal to the signal progress direction (Y direction). Each of the optical waveguides 103 has a light refractive index that varies depending on an electric field in an electric field direction from the signal electrode 104A to the ground electrode 104B.

FIGS. 9A and 9B are explanatory diagrams illustrating examples of a TE mode and a TM mode, respectively. In the optical waveguide 103, there are two modes depending on a direction of a main component of an electric field of an optical field. As illustrated in FIGS. 9A and 9B, there are a TE mode in which the main component of the electric field is in a planar direction and a TM mode in which the main component of the electric field is in a vertical direction. An arrow in FIGS. 9A and 9B indicates a direction of the main component of the electric field, and a range of a dotted line in FIGS. 9A and 9B indicates a light distribution range.

The optical modulator 100 having an X-cut thin film LN layer 113 is in the TE mode in which signal light modulated by the electric field applied from the electrode unit 104 uses an electric field in the planar direction as a main component, because the Z direction is located as the planar direction of the optical waveguide 103 as illustrated in FIG. 9A. Therefore, the TM mode in which the main component of the electric field is in the vertical direction can be said to be an unnecessary mode in the operation of the optical modulator 100.

In addition, in order to facilitate size reduction while maintaining modulating efficiency of the optical modulator 100 by increasing a length of an interaction unit constituted by the optical waveguides 103 to which the electric field is applied, that is, an influence of an optical length, it has been a demand for a structure in which the interaction unit is long such that the interaction unit is folded.

FIG. 10 is a schematic plan view illustrating an example of a configuration of an optical modulator 100A having a folded structure, and FIGS. 11A and 11B are schematic cross-sectional views illustrating examples of cross-sectional portions taken along lines F-F and G-G illustrated in FIG. 10, respectively. Note that the same components as those of the optical modulator 100 illustrated in FIGS. 7 and 8 will be denoted by the same reference signs, and the description of the overlapping components and operations will be omitted. The optical waveguides of the optical modulator 100A illustrated in FIG. 10 include an optical waveguide 103A (103) on a forward path side, a folded optical waveguide 108, and an optical waveguide 103B (103) on a backward path side.

The optical waveguide 103A on the forward path side and the optical waveguide 103B on the backward path side are optical waveguides formed in the thin film LN layer 113 along the Y direction in which the propagation direction (propagation angle) is 0 degrees. The cross-sectional portion taken along line F-F illustrated in FIG. 11A corresponds to the optical waveguide 103A on the forward path side. Note that the cores of the optical waveguide 103A on the forward path side and the optical waveguide 103B on the backward path side have the same thickness. The cores of the optical waveguide 103A on the forward path side and the optical waveguide 103B on the backward path side have, for example, a refractive index of 2.21 in the X and Y directions and have a refractive index of 2.14 in the Z direction.

The folded optical waveguide 108 is an optical waveguide formed in the thin film LN layer 113 along the Z direction in which the propagation direction (propagation angle) is other than 0 degrees, for example, 90 degrees. The cross-sectional portion taken along line G-G illustrated in FIG. 11B corresponds to the folded optical waveguide 108. The core of the folded optical waveguide 108 has the same thickness as the cores of the optical waveguide 103A on the forward path side and the optical waveguide 103B on the backward path side. The core of the folded optical waveguide 108 has, for example, a refractive index of 2.21 in the X and Y directions and has a refractive index of 2.14 in the Z direction. That is, the cores of the folded optical waveguide 108, the optical waveguide 103A on the forward path side, and the optical waveguide 103B on the backward path side have the same refractive index for each direction.

FIG. 12A is an explanatory diagram illustrating an example of dependence of a propagation angle on an effective refractive index in a case where the core of the optical waveguide 103 has a thickness of 1 µm. In a case where the core of the optical waveguide 103 has a thickness of 1 µm, the X-cut thin film LN layer 113, a refractive index in the planar direction varies depending on the propagation direction of the optical waveguide 103, resulting in a change in effective refractive index in the TE mode. In addition, a refractive index in the vertical direction is constant regardless of the propagation direction of the optical waveguide 103, and thus, an effective refractive index in the TM mode hardly changes even when the propagation direction of the optical waveguide 103 changes.

Patent Literature 1: U.S. patent Ser. No. 07/970,241
Patent Literature 2: Japanese Laid-open Patent Publication No. 2017-156454

In the optical modulator 100A, in a case where the Y direction is set to 0 degrees and the Z direction is set to 90 degrees for the propagation angle of the optical waveguide 103, the effective refractive index in the TE mode is higher as the propagation angle of the optical waveguide 103 is closer to 90 degrees as illustrated in FIG. 12A. Therefore, in the optical modulator 100A, when the core of the optical waveguide 103 is thick, there is a propagation angle at which the effective refractive index in the TE mode and the effective refractive index in the TM mode coincide with each other. As a result, the TE mode for signal light transitions to the TM mode for unnecessary light, and the crosstalk of the unnecessary TM mode occurs with respect to the TE mode.

Therefore, the crosstalk of the TM mode can be suppressed by reduce the thickness of the core of the optical waveguide 103. FIG. 12B is an explanatory diagram illustrating an example of dependence of a propagation angle on an effective refractive index in a case where the core of the optical waveguide 103 has a thickness of 0.4 µm. In a case where the thickness of the core of the optical waveguide 103 is, for example, 0.4 µm, there is no propagation angle at which the effective refractive index in the TE mode and the effective refractive index in the TM mode coincide with each other, and thus, the crosstalk with respect to the TE mode can be suppressed.

However, when the core of the optical waveguide 103 is thin in order to suppress crosstalk, the optical modulator 100A is weak in terms of confinement of light in the thin film LN layer 113. FIG. 13 is an explanatory diagram illustrating an example of a change in modulating efficiency depending on the thickness of the core of the optical waveguide 103. When the core of the optical waveguide 103 is thin, the optical modulator 100A is weak in terms of confinement of light in the thin film LN layer 113, resulting in a deterioration in modulating efficiency. FIG. 14 is an explanatory diagram illustrating an example of a change in coupling efficiency depending on the thickness of the core of the optical waveguide 103. When the core of the optical waveguide 103 is thin, the optical modulator 100A is weak in terms of confinement of light in the thin film LN layer 113. The decrease in thickness of the core causes a reduction in optical mode field, resulting in a deterioration in coupling efficiency with respect to the optical fiber. Therefore, in the optical modulator 100A, there is a trade-off relationship between the suppression of the crosstalk with respect to the TE mode and the improvements in modulating efficiency and coupling efficiency.

SUMMARY

According to an aspect of an embodiment, an optical device includes an electro-optic crystal layer, a first optical waveguide formed in the electro-optic crystal layer, an electrode that applies an electric signal to the first optical waveguide, and a second optical waveguide in an amorphous state formed in the electro-optic crystal layer and connected to the first optical waveguide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the present invention is not limited by these embodiments.

[a] First Embodiment

Figure 1:
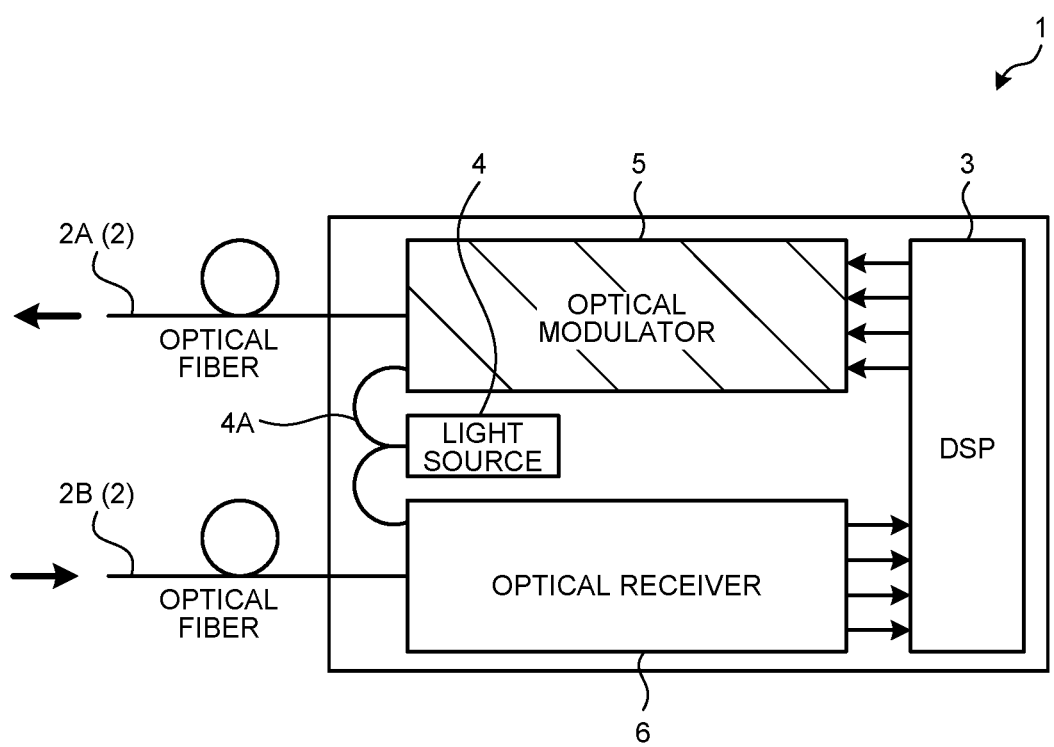
FIG. 1 is a block diagram illustrating an example of a configuration of an optical communication apparatus according to a first embodiment.

FIG. 1 is a block diagram illustrating an example of a configuration of an optical communication apparatus 1 according to a first embodiment. The optical communication apparatus 1 illustrated in FIG. 1 is connected to an optical fiber 2A (2) on an output side and an optical fiber 2B (2) on an input side. The optical communication apparatus 1 includes a digital signal processor (DSP) 3, a light source 4, an optical modulator 5, and an optical receiver 6. The DSP 3 is an electric component that executes digital signal processing. For example, the DSP 3 executes processing including encoding of transmission data, generates an electric signal including the transmission data, and outputs the generated electric signal to the optical modulator 5. In addition, the DSP 3 acquires an electric signal including reception data from the optical receiver 6, and executes processing including decoding of the acquired electric signal to obtain the reception data.

The light source 4 is, for example, a laser diode or the like, and generates light having a predetermined wavelength and supplies the light to the optical modulator 5 and the optical receiver 6 through an optical fiber 4A. The optical modulator 5 is an optical device that outputs an optical transmission signal obtained by modulating light supplied from the light source 4 according to an electric signal output from the DSP 3 to the optical fiber 2A. For example, the optical modulator 5 is an optical device such as an LN optical modulator including an optical waveguide of lithium niobate (LN) and a signal electrode having a coplanar waveguide (CPW) structure.

The optical receiver 6 receives an optical signal from the optical fiber 2B and demodulates the received optical signal using light supplied from the light source 4. Then, the optical receiver 6 converts the demodulated received optical signal into an electric signal, and outputs the converted electric signal to the DSP 3.

Figure 2:
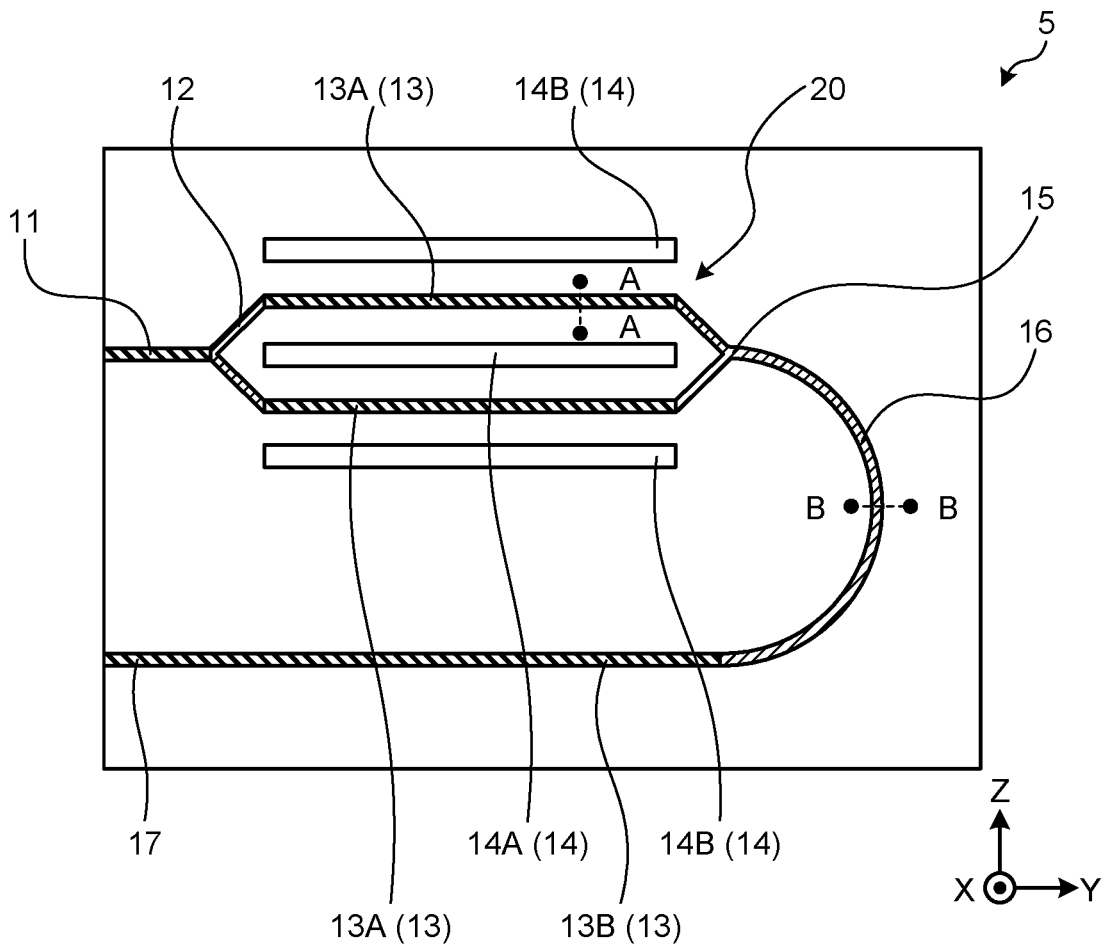
FIG. 2 is a schematic plan view illustrating an example of a configuration of an optical modulator according to the first embodiment.

FIG. 2 is a schematic plan view illustrating an example of a configuration of the optical modulator 5 according to the first embodiment. The optical modulator 5 illustrated in FIG. 2 includes an input unit 11, a branching unit 12, two first optical waveguides 13A (13) on a forward path side, an electrode unit 14, a multiplexing unit 15, a second optical waveguide 16, a first optical waveguide 13B (13) on a backward path side, and an output unit 17. Note that a length direction (propagation direction) of the optical modulator 5 is defined as a Y direction, a width direction (planar direction) of the optical modulator 5 is defined as a Z direction, and a thickness direction of the optical modulator 5 is defined as an X direction.

The input unit 11 receives light from the optical fiber 4A. Note that the light from the optical fiber 4A is light from the light source 4. The branching unit 12 branches the light from the input unit 11. The two first optical waveguides 13A on the forward path side are optical waveguides for forming a Mach-Zehnder (MZ) interaction unit that are arranged in parallel with each other to each modulate the light branched by the branching unit 12. For example, the two first optical waveguides 13A on the forward path side are ridge waveguides, each including a core and slabs disposed on both sides of the core, the slabs being thinner than the core. The two first optical waveguides 13A on the forward path side are optical waveguides formed on a thin film LN layer 33, which will be described later, along a direction substantially orthogonal to the Z direction of the crystal axis of the thin film LN layer 33, for example, the Y direction.

The electrode unit 14 is an electrode that applies an electric signal to the two first optical waveguides 13A on the forward path side. Each of the two first optical waveguides 13A on the forward path side modulates the light by changing a light refractive index according to the electric signal from the electrode unit 14, and outputs the modulated light to the multiplexing unit 15. The electrode unit 14 includes a signal electrode 14A and a pair of ground electrodes 14B. The signal electrode 14A is an electrode that applies an electric signal to the first optical waveguides 13A on the forward path side. The ground electrodes 14B are electrodes that ground the electric signal applied to the first optical waveguides 13A on the forward path side, respectively. The two first optical waveguides 13A on the forward path side modulate the light by changing the light refractive index according to the electric signal from the signal electrode 14A to change a phase of the light, and output the modulated light to the multiplexing unit 15. The multiplexing unit 15 multiplexes the light modulated by the two first optical waveguides 13A on the forward path side. In the optical modulator 5, the two first optical waveguides 13A on the forward path side and the electrode unit 14 form a modulation unit 20.

The second optical waveguide 16 is a folded optical waveguide that allows the modulated light from the multiplexing unit 15 to pass therethrough. The second optical waveguide 16 is an optical waveguide including at least one of a straight waveguide formed in the thin film LN layer 33 along a direction other than the Y direction substantially orthogonal to the Z direction or a curved waveguide whose propagation direction smoothly changes.

The first optical waveguide 13B on the backward path side is an optical waveguide that allows the modulated light from the second optical waveguide 16 to pass therethrough. The first optical waveguide 13B on the backward path side is an optical waveguide formed in the thin film LN layer 33 along the Y direction substantially orthogonal to the Z direction of the crystal axis of the thin film LN layer 33. The output unit 17 is connected to the optical fiber 2A, and outputs the modulated light from the first optical waveguide 13B on the backward path side to the optical fiber 2A.

Figure 3A:
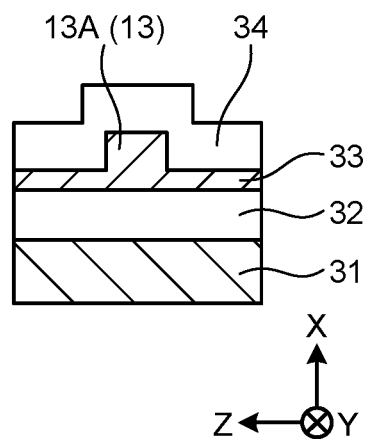
FIGS. 3A and 3B are schematic cross-sectional views illustrating examples of cross-sectional portions taken along lines A-A and B-B illustrated in FIG. 2, respectively.
Figure 3B:
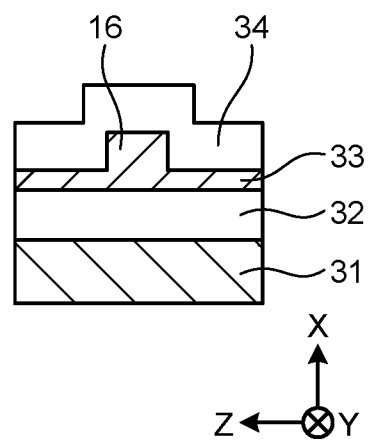

FIGS. 3A and 3B are schematic cross-sectional views illustrating examples of cross-sectional portions taken along lines A-A and B-B illustrated in FIG. 2, respectively. A portion including the first optical waveguides 13 illustrated in FIG. 3A includes a substrate 31, an intermediate layer 32 laminated on the substrate 31, a thin film LN layer 33 laminated on the intermediate layer 32, the two first optical waveguides 13 formed in the thin film LN layer 33, and a buffer layer 34 on the thin film LN layer 33. Also, a portion including the second optical waveguide 16 illustrated in FIG. 3B includes a substrate 31, an intermediate layer 32 laminated on the substrate 31, a thin film LN layer 33 laminated on the intermediate layer 32, the second optical waveguide 16 formed in the thin film LN layer 33, and a buffer layer 34 on the thin film LN layer 33.

For example, the substrate 31 is a substrate formed of $SiO_2$ (silicon dioxide), $TiO_2$ (titanium dioxide), Si, LN, or the like. The intermediate layer 32 is a layer formed of a material having a lower light refractive index than LN, for example, $SiO_2$ or $TiO_2$. Note that the intermediate layer 32 has a certain thickness to form an optically sufficient distance between the thin film LN layer 33 and the substrate 31, for example, so that the optical signal propagating through the first optical waveguides 13 and the second optical waveguide 16 formed in the thin film LN layer 33 is not radiated to the substrate 31. For example, the thickness is about 2 μm to 6 μm. The thin film LN layer 33 is a substrate using a thin film of an LN crystal which is an electro-optic crystal, with the first optical waveguides 13 formed thereon to each have a convex shape protruding upward at a predetermined position. The LN material is advantageous in size reduction because it is strong in terms of confinement of light. Moreover, the LN material is an anisotropic material whose refractive index changes when an electric field is applied thereto, for example, having a Pockels coefficient of about 30 pm/V.

The thin film LN layer 33 is an X-cut substrate. The thin film LN layer 33 is a substrate of an electro-optic crystal, for example, a $LN(LiNbO_3)$ material. The two first optical waveguides 13A on the forward path side have superior insertion loss and transmission characteristics because they are formed in the thin film LN layer 33 and their material is LN. The optical modulator 5 is structurally symmetrical, which is suitable for long-distance transmission while enabling a chirp-free operation.

The buffer layer 34 is, for example, an $SiO_2$ layer provided to prevent light propagating through the first optical waveguides 13 from being absorbed into the electrode unit 14. The thin film LN layer 33 having a thickness of 0.5 to 3 μm is sandwiched between the intermediate layer 32 and the buffer layer 34. Protrusions formed in the thin film LN layer 33 as the first optical waveguides 13 having a convex shape have a width of, for example, about 1 to 8 μm. The thin film LN layer 33 and the first optical waveguides 13 are covered by the buffer layer 34.

The signal electrode 14A is, for example, an electrode made of a metal material such as gold or copper and having a width of 2 to 10 μm and a thickness of 1 to 20 μm. The ground electrode 14B is, for example, an electrode made of a metal material such as gold or copper and having a thickness of 1 μm or more. When a driving voltage corresponding to the electric signal output from the DSP 3 is transmitted by the signal electrode 14A, an electric field is generated in a direction from the signal electrode 14A toward the ground electrode 14B, and this electric field is applied to the first optical waveguide 13. As a result, it is possible to change a refractive index of the first optical waveguide 13 according to the electric field applied to the first optical waveguide 13, thereby modulating the light propagating through the first optical waveguide 13.

When the crystal axis of the thin film LN layer 33 is set to be 90 degrees in the Z direction and 0 degrees in the Y direction, the two first optical waveguides 13A on the forward path side are straight optical waveguides formed in the Y direction of substantially 0 degrees, among optical waveguides formed in a chip of the optical modulator 5. Note that the substantially 0 degrees includes not only 0 degrees but also an error range in which the first optical waveguide 13 can be manufactured, for example, when the optical waveguide is formed aiming at 0 degrees, for example, within ±20 degrees. The two first optical waveguides 13A on the forward path side have cores set to a non-amorphous state because the cores are formed in the thin film LN layer 33 along the Y direction substantially orthogonal to the Z direction of the crystal axis of the thin film LN layer 33. Similarly to the two first optical waveguides 13A on the forward path side, the first optical waveguide 13B on the backward path side, the input unit 11, and the output unit 17 also have cores set to a non-amorphous state. Since the cores of the first optical waveguides 13A on the forward path side and the first optical waveguide 13B on the backward path side are in the non-amorphous state, the cores are set, for example, to have a refractive index of about 2.21 in the X and Y directions and have a refractive index of about 2.14 in the Z direction.

The second optical waveguide 16 is an optical waveguide formed in the thin film LN layer 33 along a direction not orthogonal to the Z direction, that is, a direction other than the Y direction of substantially 0 degrees, and has a core in an amorphous state. Note that the direction not orthogonal to the Z direction is, for example, in a range of larger than an angle actually deviated from the Y direction and equal to or smaller than 90 degrees in the Z direction. Since the cores of the second optical waveguide 16, the branching unit 12, and the multiplexing unit 15 are in the amorphous state, the cores are set, for example, to have a refractive index of about 2.175 in the X, Y, and Z directions. Since the cores of the second optical waveguides 16 are in the amorphous state, there is no propagation angle at which an effective refractive index in a TE mode and an effective refractive index in a TM mode intersect. As a result, it is possible to suppress crosstalk of the unnecessary TM mode with respect to the TE mode. Note that, similarly to the second optical waveguide 16, the branching unit 12 and the multiplexing unit 15 also have cores set to an amorphous state. Note that the second optical waveguide 16, the branching unit 12, and the multiplexing unit 15 are defined as a routed second optical waveguide connected to the first optical waveguides 13.

Since the cores of the first optical waveguides 13A on the forward path side, the first optical waveguide 13B on the backward path side, the input unit 11, and the output unit 17 are in the non-amorphous state, the cores are set, for example, to have a refractive index of about 2.21 in the X and Y directions and have a refractive index of about 2.14 in the Z direction. On the other hand, since the cores of the second optical waveguide 16, the branching unit 12, and the multiplexing unit 15 are in the amorphous state, the cores are set, for example, to have a refractive index of about 2.175 in the X, Y, and Z directions.

As an example of a process of forming the amorphous state and the non-amorphous state, argon ($Ar^+$) ions are implanted from a surface of the thin film LN layer 33 while masking cores to be set to the non-amorphous state. By implanting the $Ar^+$ ions, the LN crystal orientation of cores of the thin film LN layer 33 is collapsed to remove the anisotropy of the light refractive index, thereby bring the cores into an amorphous state. Also, the masked cores remain in the non-amorphous state. As a result, the cores in the amorphous state have no angle at which an effective refractive index of signal light in the TE mode and an effective refractive index of unnecessary light in the TM mode coincide with each other, making it possible to suppress crosstalk.

In the optical modulator 5 according to the first embodiment, the cores of the first optical waveguides 13A on the forward path side, the first optical waveguide 13B on the backward path side, the input unit 11, and the output unit 17 are in a non-amorphous state, and the cores of the second optical waveguide 16, the branching unit 12, and the multiplexing unit 15 are in an amorphous state. The cores in the amorphous state have no propagation angle at which an effective refractive index in the TE mode and an effective refractive index in the TM mode intersect. As a result, it is possible to suppress crosstalk of the unnecessary TM mode with respect to the TE mode. Furthermore, the crosstalk of the unnecessary TM mode with respect to the TE mode can be suppressed even though the cores have a large thickness, thereby improving modulating efficiency and coupling efficiency. That is, it is possible to improve modulating efficiency and coupling efficiency while suppressing crosstalk.

The second optical waveguide 16 is a straight waveguide or a curved waveguide formed in the thin film LN layer 33 along a direction other than the Y direction of the crystal axis of the X-cut thin film LN layer 33 in which light propagates. As a result, since the core of the second optical waveguide 16 is in the amorphous state, it is possible to suppress crosstalk of the unnecessary TM mode with respect to the TE mode.

Note that, although the X-cut thin film LN layer 33 has been exemplified for convenience of description, the optical modulator 5 may use a Y-cut thin film LN layer. The optical modulator 5 includes a Y-cut thin film LN layer 33, first optical waveguides 13 formed in the thin film LN layer 33 along a direction substantially orthogonal to the Z direction of the crystal axis of the thin film LN layer, and a routed second optical waveguide 16 connected to the first optical waveguides 13. The second optical waveguide 16 is a straight waveguide or a curved waveguide formed in the thin film LN layer 33 along a direction other than the X direction of the crystal axis of the thin film LN layer 33 in which light propagates. In addition, the cores of the first optical waveguides 13A on the forward path side, the first optical waveguide 13B on the backward path side, the input unit 11, and the output unit 17 are in a non-amorphous state, and the cores of the second optical waveguide 16, the branching unit 12, and the multiplexing unit 15 are in an amorphous state. The cores in the amorphous state have no propagation angle at which an effective refractive index in the TE mode and an effective refractive index in the TM mode intersect. As a result, it is possible to suppress crosstalk of the unnecessary TM mode with respect to the TE mode. Furthermore, the crosstalk of the unnecessary TM mode with respect to the TE mode can be suppressed even though the cores have a large thickness, thereby improving modulating efficiency and coupling efficiency.

In addition, although the thin film LN layer 33 has been exemplified, the material of the electro-optic crystal is not limited to LN, and any type of anisotropic electro-optic crystal may be used. For example, the material of the electro-optic crystal may be a perovskite type oxide such as lead zirconate titanate (PZT), lanthanum-doped lead zirconate titanate (PLZT), or barium titanate ($BaTiO_3$), and can be appropriately modified. Since PZT has a Pockels coefficient of about 110 pm/V, PLZT has a Pockels coefficient of about 700 pm/V, and $BaTiO_3$ has a Pockels coefficient of about 1850 pm/V, the material of the electro-optic crystal applied to the present invention has a Pockels coefficient in the range of 10 to 2000 pm/V.

In addition, although it has been exemplified that the first optical waveguides 13 and the second optical waveguide 16 are ridge waveguides, but the first optical waveguides 13 and the second optical waveguide 16 are not limited to ridge waveguides, and for example, channel waveguides can be used.

Although the second optical waveguide 16, the branching unit 12, and the multiplexing unit 15 have been exemplified as a routed optical waveguide connected to the first optical waveguides 13, the routed optical waveguide connected to the first optical waveguides 13 is not limited thereto, and can be appropriately modified. In addition, it has been exemplified that the cores of the second optical waveguide 16, other than the first optical waveguides 13 to which the electric signal from the electrode unit 14 is applied, are in the amorphous state. However, among the cores of the second optical waveguide 16, for example, a core whose light propagation direction is parallel to the first optical waveguides 13 may be in a non-amorphous state, and the states of the cores can be appropriately modified.

Note that it has been exemplified for the optical modulator 5 according to the first embodiment that the electric signal from the electrode unit 14 is applied to the two first optical waveguides 13A on the forward path side. However, in addition to the two first optical waveguides 13A on the forward path side, two first optical waveguides 13C may be arranged to form an interaction unit on the backward path side as well, and this will be described below as a second embodiment.

[b] Second Embodiment

Figure 4:
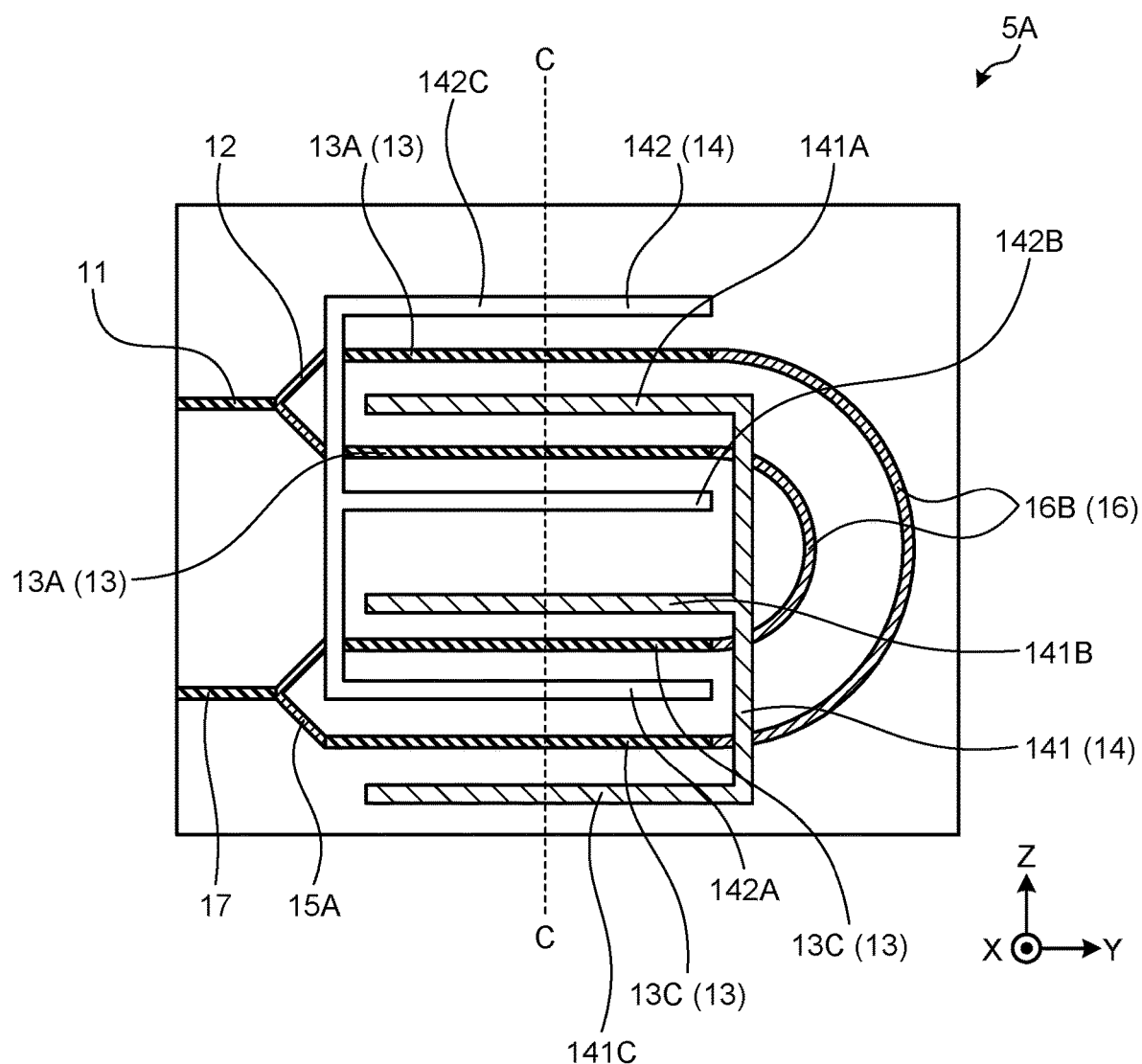
FIG. 4 is a schematic plan view illustrating an example of a configuration of an optical modulator according to a second embodiment.

FIG. 4 is a schematic plan view illustrating an example of a configuration of an optical modulator 5A according to the second embodiment. Note that the same components as those of the optical modulator 5 according to the first embodiment will be denoted by the same reference signs, and the description of the overlapping components and operations will be omitted. The optical modulator 5A illustrated in FIG. 4 includes an input unit 11, a branching unit 12, two first optical waveguides 13A on a forward path side, and two folded second optical waveguides 16B. Further, the optical modulator 5A includes two first optical waveguides 13C on a backward path side, a first electrode unit 141 (14), a second electrode unit 142 (14), a multiplexing unit 15A, and an output unit 17.

The input unit 11 receives light from the optical fiber 4A. The branching unit 12 branches the light from the input unit 11. The two first optical waveguides 13A on the forward path side are optical waveguides for forming an MZ interaction unit that are arranged in parallel with each other to each modulate the light branched by the branching unit 12. The two second optical waveguides 16B are folded optical waveguides connected to the two first optical waveguides 13A on the forward path side. The two first optical waveguides 13C on the backward path side are optical waveguides for forming an MZ interaction unit that are arranged in parallel with each other and connected to the two second optical waveguides 16B, respectively.

One of the first optical waveguides 13A on the forward path side is connected to one of the second optical waveguides 16B, and one of the second optical waveguides 16B is connected to one of the first optical waveguides 13C on the backward path side. The other one of the first optical waveguides 13A on the forward path side is connected to the other one of the second optical waveguides 16B, and the other one of the second optical waveguides 16B is connected to the other one of the first optical waveguides 13C on the backward path side.

The first electrode unit 141 includes a first electrode 141A disposed between the two first optical waveguides 13A on the forward path side, and a second electrode 141B and a third electrode 141C disposed outside the two first optical waveguides 13C on the backward path side, respectively. The second electrode unit 142 includes a fourth electrode 142A disposed between the two first optical waveguides 13C on the backward path side, and a fifth electrode 142B and a sixth electrode 142C disposed outside the two first optical waveguides 13A on the forward path side, respectively. The second electrode unit 142 has a higher potential than the first electrode unit 141.

One of the first optical waveguides 13A on the forward path side applies an electric field in the –Z direction from the sixth electrode 142C of the second electrode unit 142 to the first electrode 141A of the first electrode unit 141. One of first optical waveguides 14C on the backward path side applies an electric field in the –Z direction from the fourth electrode 142A of the second electrode unit 142 to the third electrode 141C of the first electrode unit 141. As a result, since the direction of the electric field applied to one of the first optical waveguides 13A on the forward path side and the direction of the electric field applied to one of the first optical waveguide 13C on the backward path side are the same as the –Z direction, a phase change occurs in the same direction, resulting in an improvement in modulating efficiency.

The other one of the first optical waveguides 13A on the forward path side applies an electric field in the +Z direction from the fifth electrode 142B of the second electrode unit 142 to the first electrode 141A of the first electrode unit 141. The other one of the first optical waveguides 13C on the backward path side applies an electric field in the +Z direction from the fourth electrode 142A of the second electrode unit 142 to the second electrode 141B of the first electrode unit 141. As a result, since the direction of the electric field applied to the other one of the first optical waveguides 13A on the forward path side and the direction of the electric field applied to the other one of the first optical waveguide 13C on the backward path side are the same as the +Z direction, a phase change occurs in the same direction, resulting in an improvement in modulating efficiency.

The multiplexing unit 15A multiplexes the modulated light passing through the two first optical waveguides 13C on the backward path side. The output unit 17 outputs the modulated light multiplexed by the multiplexing unit 15A to the optical fiber 4A.

The two first optical waveguides 13A on the forward path side, the two first optical waveguides 13C on the backward path side, the input unit 11, and the output unit 17 have cores set to a non-amorphous state. Since the cores of the first optical waveguides 13A on the forward path side, the first optical waveguides 13C on the backward path side, the input unit 11, and the output unit 17 are in the non-amorphous state, the cores are set, for example, to have a refractive index of about 2.21 in the X and Y directions and have a refractive index of about 2.14 in the Z direction. The second optical waveguides 16B, the branching unit 12, and the multiplexing unit 15A have cores set to an amorphous state. Since the cores of the second optical waveguides 16, the branching unit 12, and the multiplexing unit 15A are in the amorphous state, the cores are set, for example, to have a refractive index of about 2.175 in the X, Y, and Z directions.

As an example of a process of forming the amorphous state and the non-amorphous state, $Ar^+$ ions are implanted from a surface of the thin film LN layer 33 while masking cores to be set to the non-amorphous state. By implanting the $Ar^+$ ions, the LN crystal orientation of cores of the thin film LN layer 33 is collapsed to remove the anisotropy of the light refractive index, thereby bring the cores into an amorphous state. Also, the masked cores remain in the non-amorphous state. As a result, the cores in the amorphous state have no angle at which an effective refractive index of signal light in the TE mode and an effective refractive index of unnecessary light in the TM mode coincide with each other, making it possible to suppress crosstalk.

In the optical modulator 5A according to the second embodiment, the cores of the two first optical waveguides 13A on the forward path side, the two first optical waveguides 13C on the backward path side, the input unit 11, and the output unit 17 are in a non-amorphous state, and the cores of the second optical waveguides 16B, the branching unit 12, and the multiplexing unit 15A are in an amorphous state. The cores in the amorphous state have no propagation angle at which an effective refractive index in the TE mode and an effective refractive index in the TM mode intersect. As a result, it is possible to suppress crosstalk of the unnecessary TM mode with respect to the TE mode. Furthermore, the crosstalk of the unnecessary TM mode with respect to the TE mode can be suppressed even though the cores have a large thickness, thereby improving modulating efficiency and coupling efficiency.

In the optical modulator 5A, by applying an electric field to the two first optical waveguides 13A on the forward path side disposed before the folded optical waveguides and the two first optical waveguides 13C on the backward path side disposed after the folded optical waveguides, it is possible to facilitate improvements in modulating efficiency and size reduction.

Note that it has been exemplified for the optical modulator 5 according to the first embodiment that the electrode unit 14 is disposed around the first optical waveguides 13A on the forward path side to form an interaction unit. However, another electrode unit 14 may be disposed around the first optical waveguides 13C on the backward path side to form another interaction unit, in addition to the interaction unit around the first optical waveguides 13A on the forward path side, and this will be described below as a third embodiment.

[c] Third Embodiment

Figure 5:
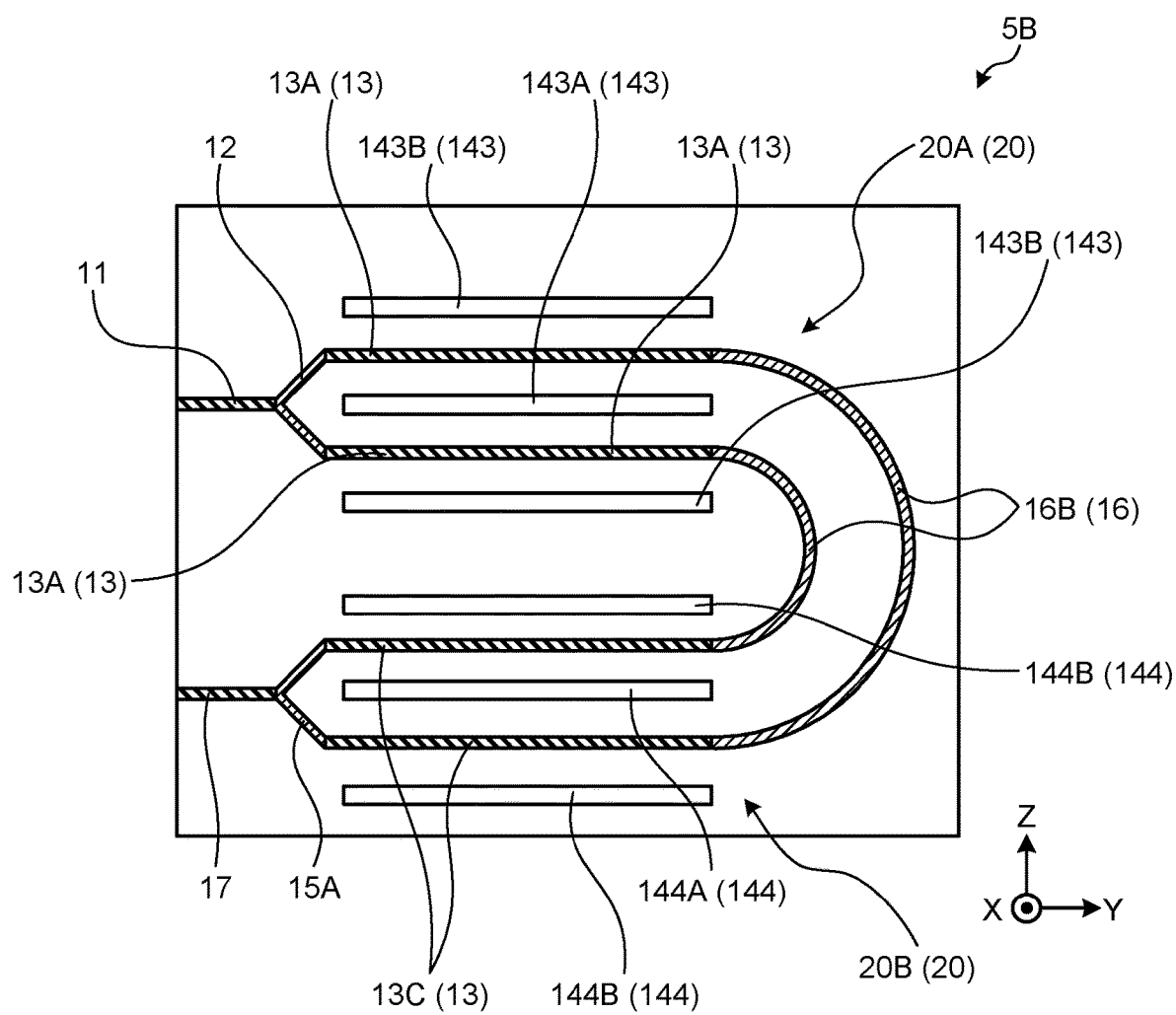
FIG. 5 is a schematic plan view illustrating an example of a configuration of an optical modulator according to a third embodiment.

FIG. 5 is a schematic plan view illustrating an example of a configuration of an optical modulator 5B according to the third embodiment. Note that the same components as those of the optical modulator 5 according to the first embodiment will be denoted by the same reference signs, and the description of the overlapping components and operations will be omitted. The optical modulator 5B illustrated in FIG. 5 includes an input unit 11, a branching unit 12, two first optical waveguides 13A on a forward path side, a third electrode unit 143, second optical waveguides 16B, two first optical waveguides 13C on a backward path side, a fourth electrode unit 144, a multiplexing unit 15A, and an output unit 17.

The input unit 11 receives light from the optical fiber 4A. The branching unit 12 branches the light from the input unit 11. The two first optical waveguides 13A on the forward path side are first optical waveguides 13 for forming an MZ interaction unit that are arranged in parallel with each other to each modulate the light branched by the branching unit 12. The third electrode unit 143 includes a signal electrode 143A that applies a first electric signal to the two first optical waveguides 13A on the forward path side, and ground electrodes 143B that ground the first electric signal from the two first optical waveguides 13A on the forward path side, respectively. Note that the two first optical waveguides 13A on the forward path side and the third electrode unit 143 constitute a first modulation unit 20A (20). For example, the first modulation unit 20A is a direct current (DC) modulation unit in which a bias voltage is applied as the first electric signal from the third electrode unit 143 to the two first optical waveguides 13A on the forward path side.

The second optical waveguides 16B are folded optical waveguides that are arranged in parallel with each other and connected to the two first optical waveguides 13A on the forward path side, respectively, to allow the light modulated by the two first optical waveguides 13A on the forward path side to pass therethrough.

The two first optical waveguides 13C on the backward path side are first optical waveguides 13 that are arranged in parallel with each other and connected to the two second optical waveguides 16B, respectively. The fourth electrode unit 144 includes a signal electrode 144A that applies a second electric signal to the two first optical waveguides 13C on the backward path side, and ground electrodes 144B that ground the second electric signal from the two first optical waveguides 13C on the backward path side, respectively. Note that the two first optical waveguides 13C on the backward path side and the fourth electrode unit 144 constitute a second modulation unit 20B (20). For example, the second modulation unit 20B is a radio frequency (RF) modulation unit in which the fourth electrode unit 144 applies a high-frequency signal as the second electric signal to the two first optical waveguides 13C on the backward path side.

The multiplexing unit 15A is connected to the two first optical waveguides 13C on the backward path side to multiplex the light passing therethrough after being modulated by the two first optical waveguides 13C on the backward path side. The output unit 17 outputs the modulated light multiplexed by the multiplexing unit 15A to the optical fiber 2A.

The two first optical waveguides 13A on the forward path side, the two first optical waveguides 13C on the backward path side, the input unit 11, and the output unit 17 have cores set to a non-amorphous state. Since the cores of the first optical waveguides 13A on the forward path side, the first optical waveguides 13C on the backward path side, the input unit 11, and the output unit 17 are in the non-amorphous state, the cores are set, for example, to have a refractive index of about 2.21 in the X and Y directions and have a refractive index of about 2.14 in the Z direction. The second optical waveguides 16B, the branching unit 12, and the multiplexing unit 15A have cores set to an amorphous state. Since the cores of the second optical waveguides 16, the branching unit 12, and the multiplexing unit 15A are in the amorphous state, the cores are set, for example, to have a refractive index of about 2.175 in the X, Y, and Z directions.

As an example of a process of forming the amorphous state and the non-amorphous state, $Ar^+$ ions are implanted from a surface of the thin film LN layer 33 while masking cores to be set to the non-amorphous state. By implanting the $Ar^+$ ions, the LN crystal orientation of cores of the thin film LN layer 33 is collapsed to remove the anisotropy of the light refractive index, thereby bring the cores into an amorphous state. Also, the masked cores remain in the non-amorphous state. As a result, the cores in the amorphous state have no angle at which an effective refractive index of signal light in the TE mode and an effective refractive index of unnecessary light in the TM mode coincide with each other, making it possible to suppress crosstalk.

In the optical modulator 5B according to the third embodiment, the cores of the two first optical waveguides 13A on the forward path side, the two first optical waveguides 13C on the backward path side, the input unit 11, and the output unit 17 are in a non-amorphous state, and the cores of the second optical waveguides 16B, the branching unit 12, and the multiplexing unit 15A are in an amorphous state. Since the cores of the second optical waveguides 16 are in the amorphous state, there is no propagation angle at which an effective refractive index in a TE mode and an effective refractive index in a TM mode intersect. As a result, even in a case where the first modulation unit 20A is disposed before the folded optical waveguides and the second modulation unit 20B is disposed after the folded optical waveguides, it is possible to suppress crosstalk of the unnecessary TM mode with respect to the TE mode. Furthermore, the crosstalk of the unnecessary TM mode with respect to the TE mode can be suppressed even though the cores have a large thickness, thereby improving modulating efficiency and coupling efficiency.

Note that, although it has been exemplified for convenience of description that the first modulation unit 20A is a DC modulation unit and the second modulation unit 20B is an RF modulation unit, but the first modulation unit 20A and the second modulation unit 20B are not limited thereto. For example, the second modulation unit 20B may be a DC modulation unit, and the first modulation unit 20A and the second modulation unit 20B can be appropriately modified.

[d] Fourth Embodiment

Figure 6:
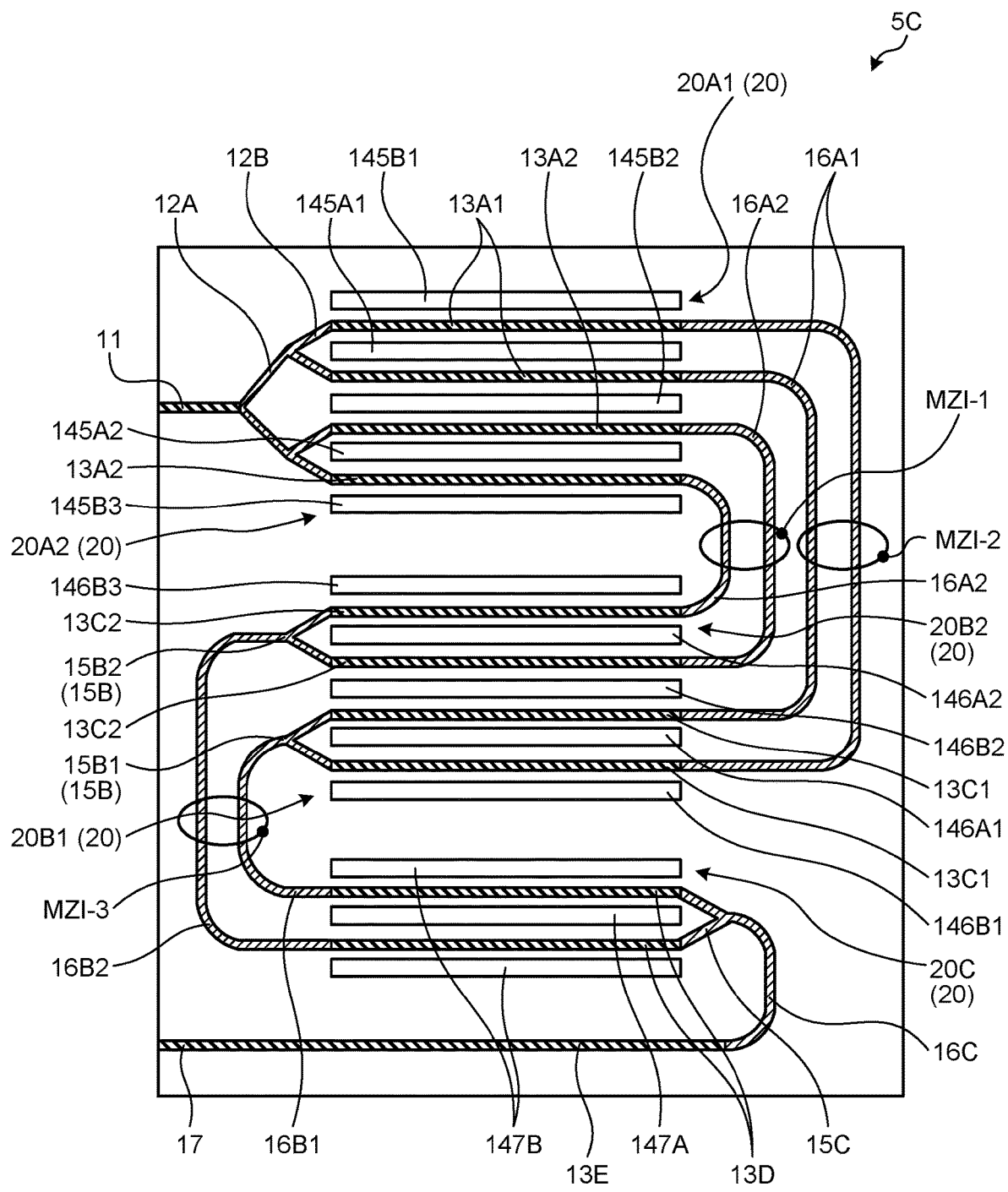
FIG. 6 is a schematic plan view illustrating an example of a configuration of an optical modulator according to a fourth embodiment.
Figure 6:
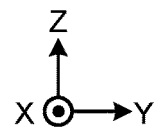
Figure 7:
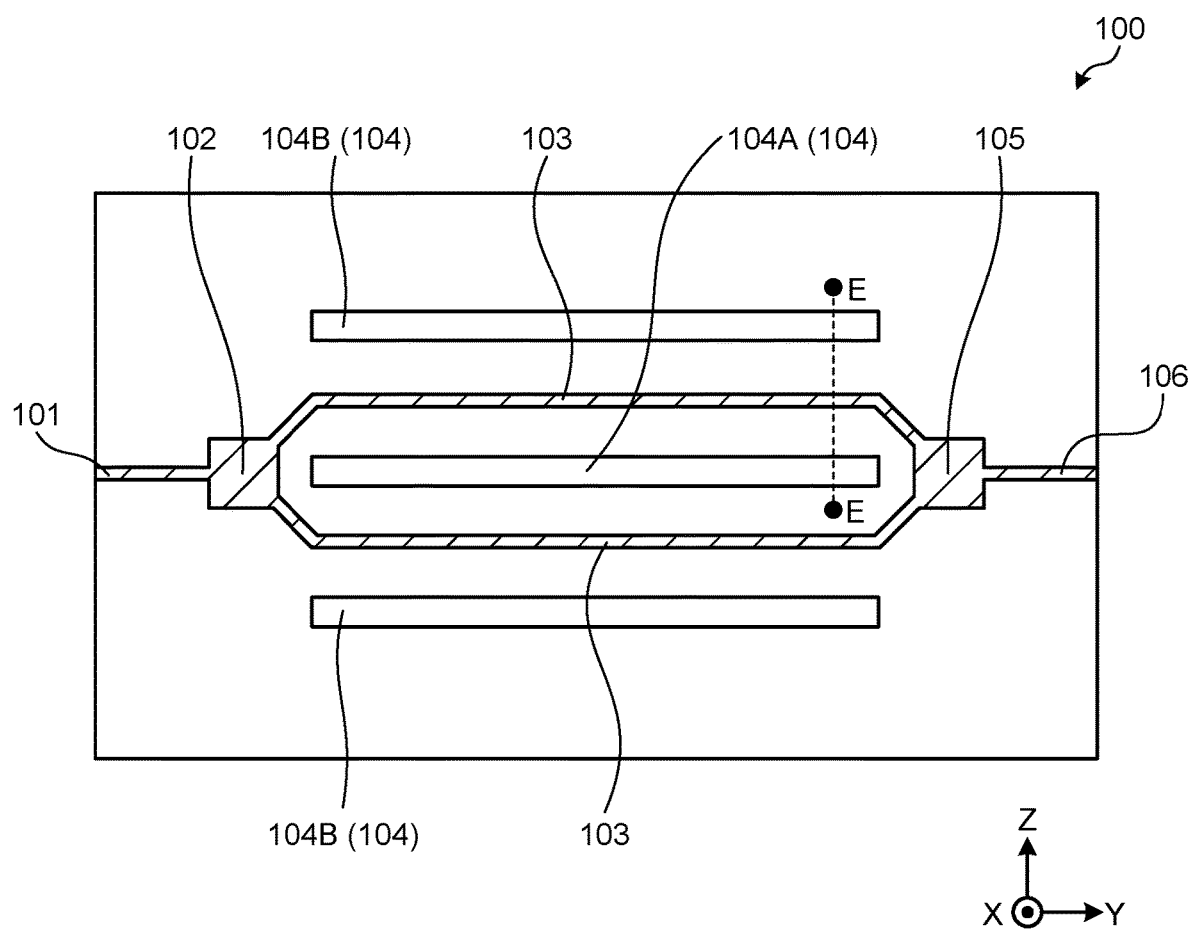
FIG. 7 is a schematic plan view illustrating an example of a configuration of an optical modulator.
Figure 8:
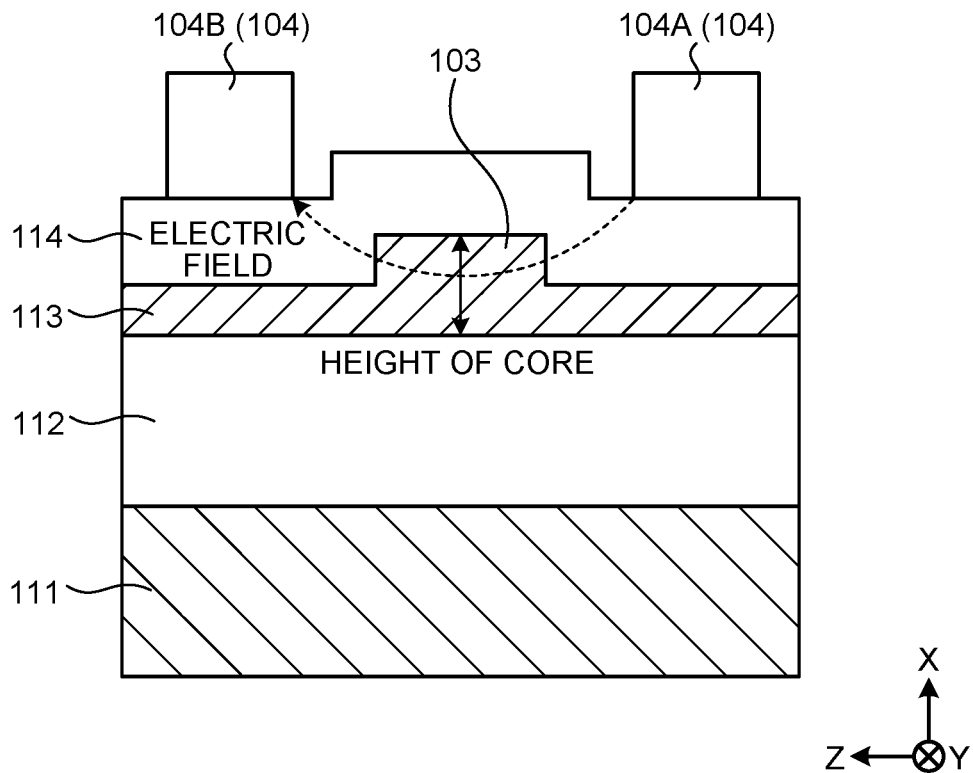
FIG. 8 is a schematic cross-sectional view illustrating an example of a cross-sectional portion taken along line E-E illustrated in FIG. 7.
Figure 9A:
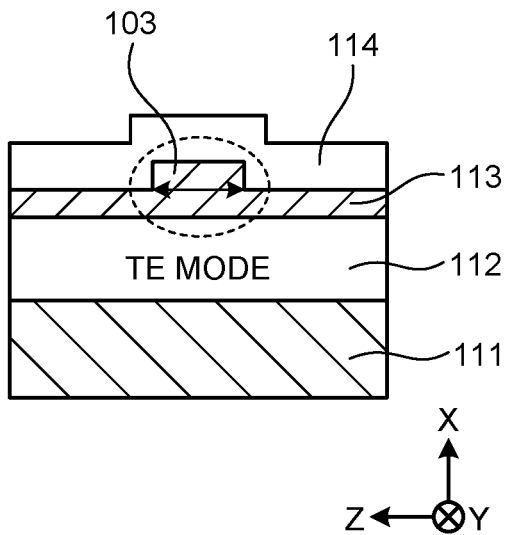
FIGS. 9A and 9B are explanatory diagrams illustrating examples of a TE mode and a TM mode, respectively.
Figure 9B:
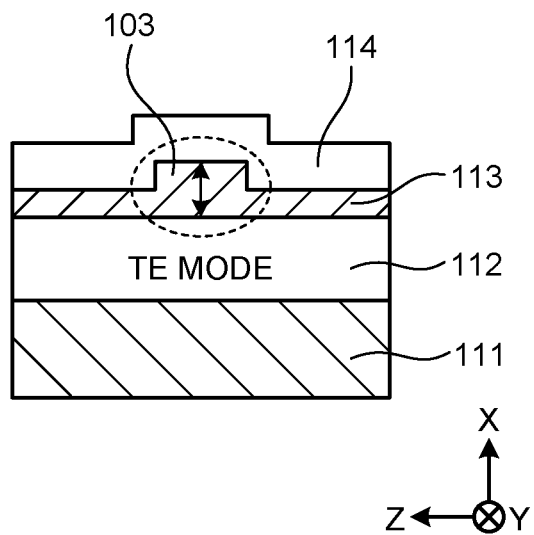
Figure 10:
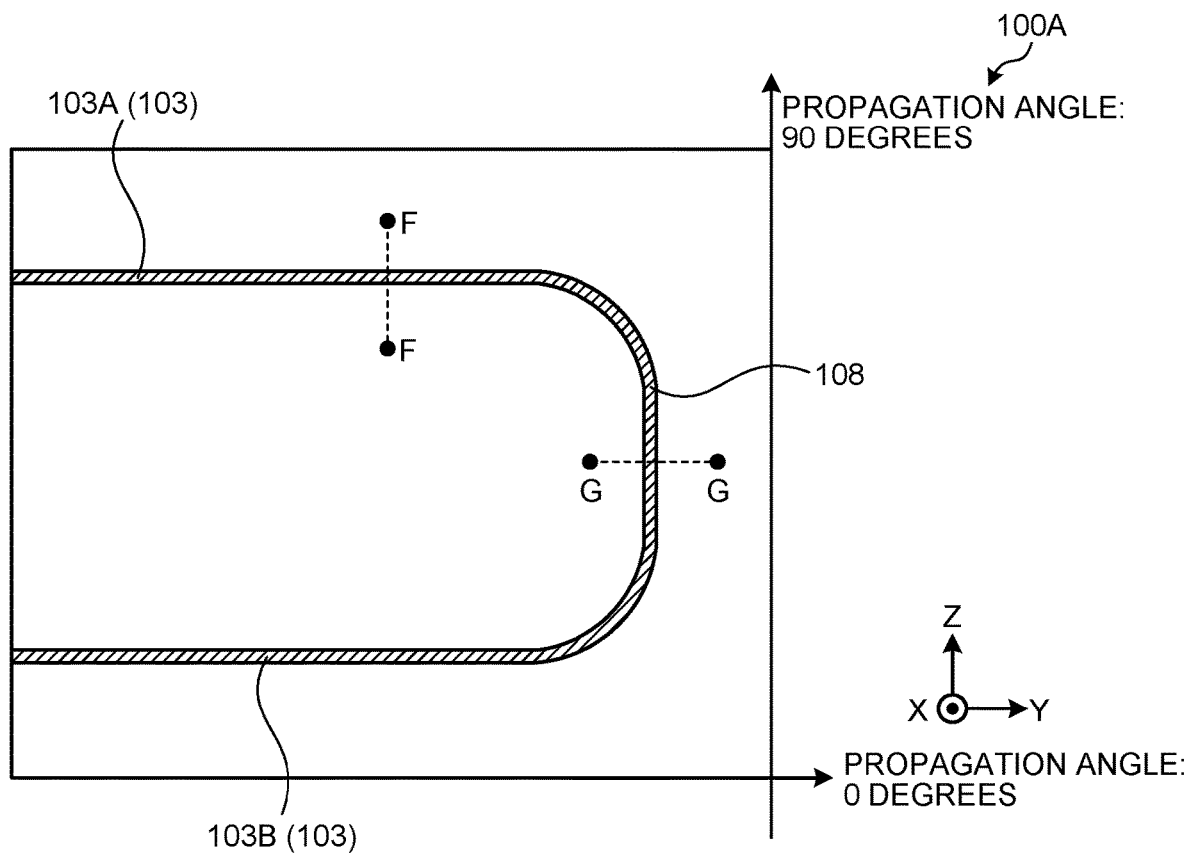
FIG. 10 is a schematic plan view illustrating an example of a configuration of an optical modulator having a folded structure.
Figure 11A:
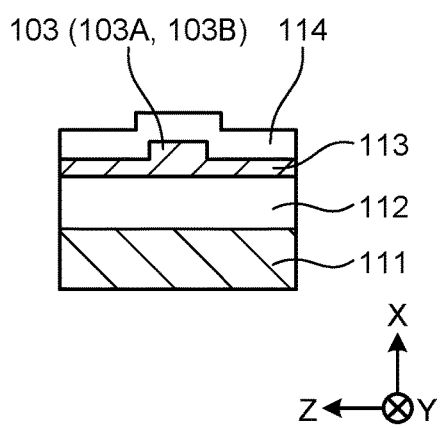
FIGS. 11A and 11B are schematic cross-sectional views illustrating examples of cross-sectional portions taken along lines F-F and G-G illustrated in FIG. 10, respectively.
Figure 11B:
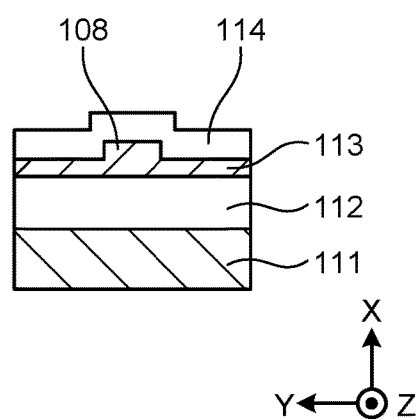
Figure 12A:
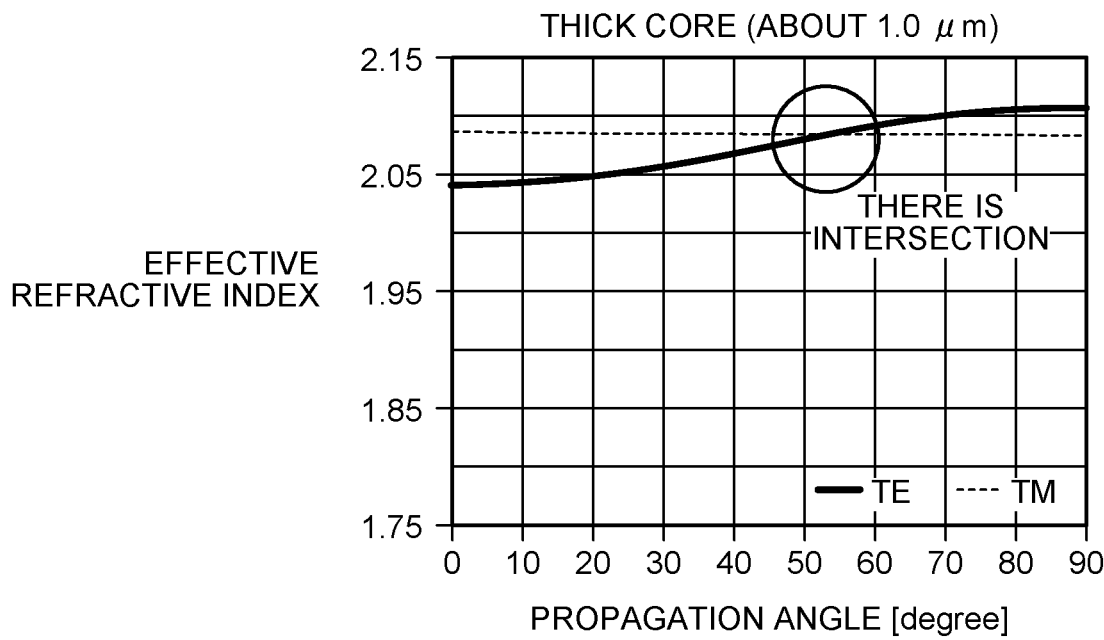
FIG. 12A is an explanatory diagram illustrating an example of dependence of a propagation angle on an effective refractive index in a case where a core of an optical waveguide has a thickness of 1 μm.
Figure 12B:
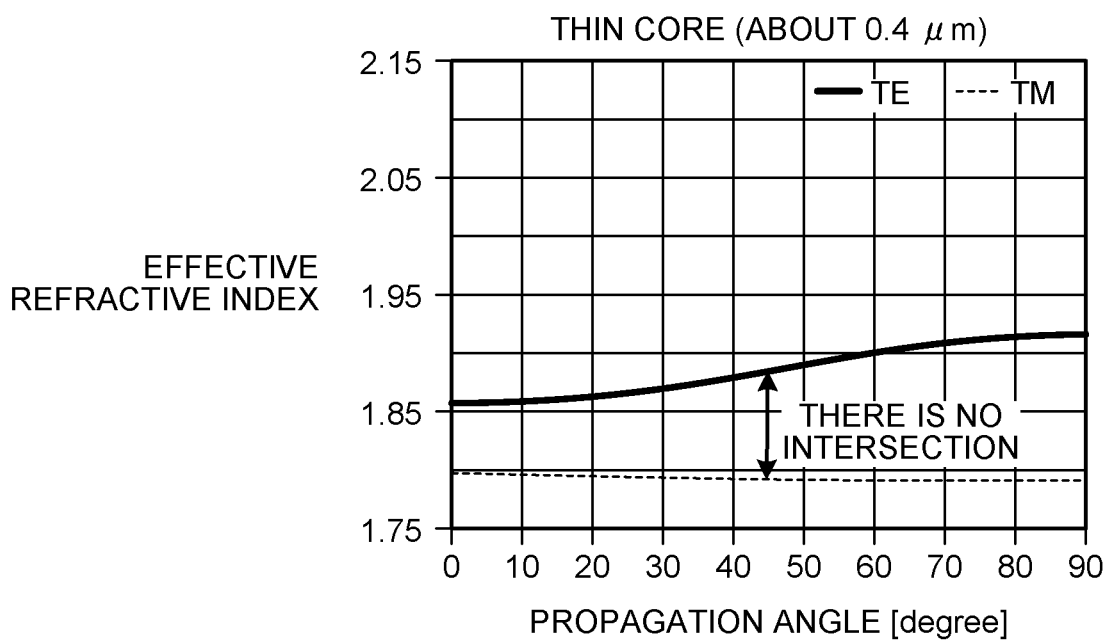
FIG. 12B is an explanatory diagram illustrating an example of dependence of a propagation angle on an effective refractive index in a case where a core of an optical waveguide has a thickness of 0.4 μm.
Figure 13:
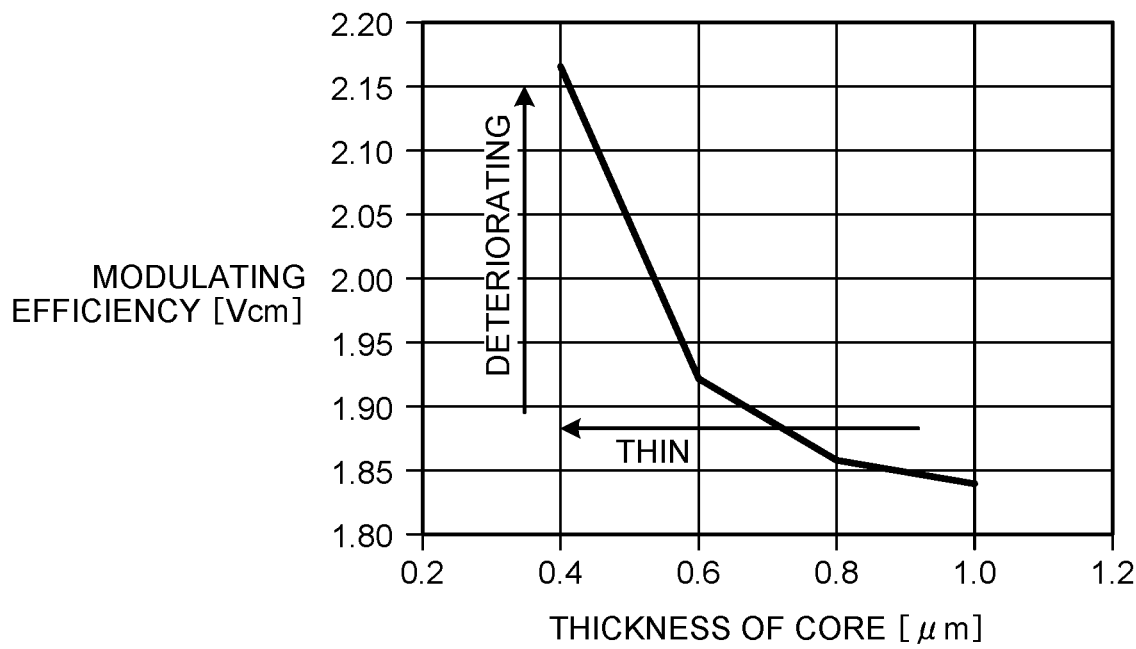
FIG. 13 is an explanatory diagram illustrating an example of a change in modulating efficiency depending on the thickness of the core of the optical waveguide.
Figure 14:
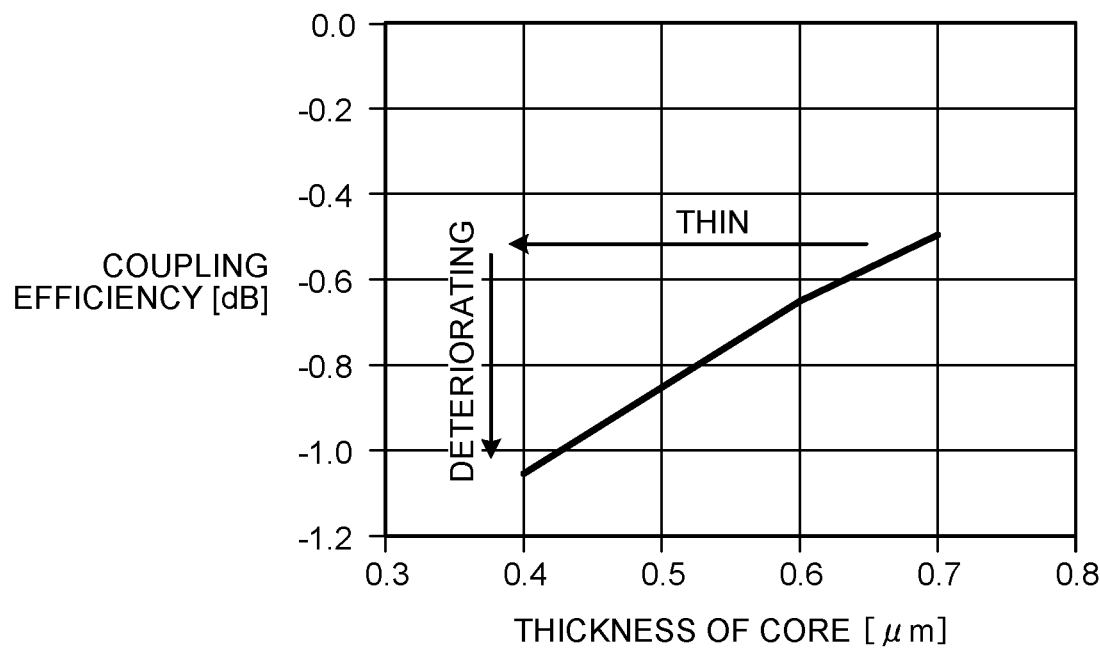
FIG. 14 is an explanatory diagram illustrating an example of a change in coupling efficiency depending on the thickness of the core of the optical waveguide.

FIG. 6 is a schematic plan view illustrating an example of a configuration of an optical modulator 5C according to a fourth embodiment. The optical modulator 5C illustrated in FIG. 6 is an IQ modulator. The optical modulator 5C includes an input unit 11, a first branching unit 12A, a pair of second branching units 12B, two first optical waveguides 13A1 and two first optical waveguides 13A2 on a forward path side at a leading stage, a fifth electrode unit 145, and second optical waveguides 16A1 and 16A2 at the leading stage. The optical modulator 5C includes two first optical waveguides 13C1 and two first optical waveguides 13C2 on a backward path side at the leading stage, a sixth electrode unit 146, a pair of first multiplexing units 15B, and two second optical waveguides 16B1 and 16B2 at a middle stage. Further, the optical modulator 5C includes two first optical waveguides 13D on a forward path side at a trailing stage, a seventh electrode unit 147, a second optical waveguide 16C at the trailing stage, an first optical waveguide 13E on a backward path side at the trailing stage, and an output unit 17.

The input unit 11 receives light from the optical fiber 4A. The first branching unit 12A branches the light from the input unit 11. The second branching units 12B output the light branched by the first branching unit 12A to the two first optical waveguides 13A1 and the two first optical waveguides 13A2 on the forward path side, respectively, to modulate the light.

The two first optical waveguides 13A1 and the two first optical waveguides 13A2 on the forward path side at the leading stage are optical waveguides for forming MZ interaction units that are arranged in parallel with each other to each modulate the light branched by the second branching unit 12B. The fifth electrode unit 145 includes a first signal electrode 145A1, a second signal electrode 145A2, a first ground electrode 145B1, a second ground electrode 145B2, and a third ground electrode 145B3. The first signal electrode 145A1 applies a first electric signal to one pair of two first optical waveguides 13A1 on the forward path side at the leading stage. The first ground electrode 145B1 grounds the first electric signal from one first optical waveguide 13A1 of the two first optical waveguides 13A1 on the forward path side. The second ground electrode 145B2 grounds the first electric signal from the other first optical waveguide 13A1 of the two first optical waveguides 13A1 on the forward path side at the leading stage. The one pair of first optical waveguides 13A1 on the forward path side at the leading stage and the fifth electrode unit 145 constitute a first RF modulation unit 20A1.

The second signal electrode 145A2 applies a second electric signal to the other pair of two first optical waveguides 13A2 on the forward path side at the leading stage. The third ground electrode 145B3 grounds the second electric signal from the other first optical waveguide 13A2 of the other pair of two first optical waveguides 13A2 on the forward path side at the leading stage. The second ground electrode 145B2 grounds the second electric signal from one first optical waveguide 13A2 of the other pair of two first optical waveguides 13A2 on the forward path side at the leading stage. The other pair of first optical waveguides 13A2 on the forward path side at the leading stage and the fifth electrode unit 145 constitute a second RF modulation unit 20A2.

A second optical waveguides 16A at the leading stage are arranged in parallel with each other, and include one pair of two second optical waveguides 16A1 at the leading stage and the other pair of two second optical waveguides 16A2 at the leading stage. The one pair of two second optical waveguides 16A1 at the leading stage are folded optical waveguides connected to the one pair of two first optical waveguides 13A1 on the forward path side to allow the light modulated by the one pair of two first optical waveguides 13A1 on the forward path side at the leading stage to pass therethrough. The other pair of two second optical waveguides 16A2 at the leading stage are folded optical waveguides connected to the other pair of two first optical waveguides 13A2 on the forward path side at the leading stage to allow the light modulated by the other pair of two first optical waveguides 13A2 on the forward path side at the leading stage to pass therethrough.

One pair of two first optical waveguides 13C1 on the backward path side at the leading stage are first optical waveguides arranged in parallel with each other, and connected to the one pair of two second optical waveguides 16A1 at the leading stage. The other pair of two first optical waveguides 13C2 on the backward path side at the leading stage are first optical waveguides arranged in parallel with each other, and connected to the other pair of two second optical waveguides 16A2 at the leading stage.

The sixth electrode unit 146 includes a first signal electrode 146A1, a second signal electrode 146A2, a first ground electrode 146B1, a second ground electrode 146B2, and a third ground electrode 146B3. The first signal electrode 146A1 of the sixth electrode unit 146 applies a third electric signal to the one pair of two first optical waveguides 13C1 on the backward path side at the leading stage. The first ground electrode 146B1 of the sixth electrode unit 146 grounds the third electric signal from one first optical waveguide 13C1 of the one pair of two first optical waveguides 13C1 on the backward path side at the leading stage. The second ground electrode 146B2 of the sixth electrode unit 146 grounds the third electric signal from the other first optical waveguide 13C1 of the one pair of two first optical waveguides 13C1 on the backward path side at the leading stage. The one pair of first optical waveguides 13C1 on the backward path side at the leading stage and the sixth electrode unit 146 constitute a first DC modulation unit 20B1 (20).

The second signal electrode 146A2 of the sixth electrode unit 146 applies a fourth electric signal to the other pair of two first optical waveguides 13C2 on the backward path side at the leading stage. The third ground electrode 146B3 of the sixth electrode unit 146 grounds the fourth electric signal from the other first optical waveguide 13C2 of the other pair of two first optical waveguides 13C2 on the backward path side at the leading stage. The second ground electrode 146B2 of the sixth electrode unit 146 grounds the fourth electric signal from one first optical waveguide 13C2 of the other pair of two first optical waveguides 13C2 on the backward path side at the leading stage. The other pair of first optical waveguides 13C2 on the backward path side at the leading stage and the sixth electrode unit 146 constitute a second DC modulation unit 20B2 (20).

One first multiplexing unit 15B1 is connected to the one pair of two first optical waveguides 13C1 on the backward path side at the leading stage to multiplex the light passing therethrough after being modulated by the one pair of two first optical waveguides 13C1 on the backward path side at the leading stage. The other first multiplexing unit 15B2 is connected to the other pair of two first optical waveguides 13C2 on the backward path side at the leading stage to multiplex the light passing therethrough after being modulated by the other pair of two first optical waveguides 13C2 on the backward path side at the leading stage.

The second optical waveguides 16B at the middle stage are arranged in parallel with each other, and include one second optical waveguide 16B1 at the middle stage and the other second optical waveguide 16B2 at the middle stage. The one second optical waveguide 16B1 at the middle stage is a folded optical waveguide connected to the one first multiplexing unit 15B1 to allow the light from the one first multiplexing unit 15B1 to pass therethrough. The other second optical waveguide 16B2 at the middle stage is a folded optical waveguide connected to the other first multiplexing unit 15B2 to allow the light from the other first multiplexing unit 15B2 to pass therethrough.

The two first optical waveguides 13D on the forward path side at the trailing stage are first optical waveguides connected to the second optical waveguides 16B1 and 16B2 at the middle stage. The seventh electrode unit 147 includes a signal electrode 147A that applies a fifth electric signal to the two first optical waveguides 13D on the forward path side at the trailing stage, and a pair of ground electrodes 147B that grounds the fifth electric signal from the two first optical waveguides 13D on the forward path side at the trailing stage, respectively. The two first optical waveguides 13D on the forward path side at the trailing stage and the seventh electrode unit 147 constitute a parent DC modulation unit 20C.

A second multiplexing unit 15C is connected to the two first optical waveguides 13D on the forward path side at the trailing stage to multiplex the light modulated by the two first optical waveguides 13D on the forward path side at the trailing stage. The second optical waveguide 16C at the trailing stage is a folded optical waveguide connected to the second multiplexing unit 15C to allow the light from the second multiplexing unit 15C to pass therethrough. One first optical waveguide 13E on the backward path side at the trailing stage is a first optical waveguide connected to the second optical waveguide 16C at the trailing stage. The output unit 17 is connected to the first optical waveguide 13E on the backward path side at the trailing stage to output the light from the first optical waveguide 13E on the backward path side at the trailing stage to the optical fiber 2A.

That is, the optical modulator 5C includes a first RF modulation unit 20A1 and a second RF modulation unit 20A2 over the first optical waveguides 13A on the forward path side at the leading stage, and a first DC modulation unit 20B1 and a second DC modulation unit 20B2 over the first optical waveguides 13C on the backward path side at the leading stage. Further, the optical modulator 5C includes a parent DC modulation unit 20C over the first optical waveguides 13D on the forward path side at the trailing stage. As a result, the optical modulator 5C constitutes an IQ modulator.

The two first optical waveguides 13A1 and the two first optical waveguides 13A2 on the forward path side at the leading stage, the two first optical waveguides 13C1 and the two first optical waveguides 13C2 on the backward path side at the leading stage, the two first optical waveguides 13D on the forward path side at the trailing stage, the first optical waveguide 13E on the backward path side at the trailing stage, the input unit 11, and the output unit 17 have cores set to a non-amorphous state. Since the cores of the two first optical waveguides 13A1 and the two first optical waveguides 13A2 on the forward path side at the leading stage, the two first optical waveguides 13C1 and the two first optical waveguides 13C2 on the backward path side at the leading stage, the two first optical waveguides 13D on the forward path side at the trailing stage, the first optical waveguide 13E on the backward path side at the trailing stage, the input unit 11, and the output unit 17 are in the non-amorphous state, the cores are set, for example, to have a refractive index of about 2.21 in the X and Y directions and have a refractive index of about 2.14 in the Z direction.

On the other hand, the second optical waveguides 16A1 and 16A2 at the leading stage, the second optical waveguides 16B1 and 16B2 at the middle stage, the second optical waveguide 16C at the trailing stage, the first branching unit 12A, the second branching units 12B, the first multiplexing units 15B, and the second multiplexing unit 15C have cores set to an amorphous state. Since the cores of the second optical waveguides 16A1 and 16A2 at the leading stage, the second optical waveguides 16B1 and 16B2 at the middle stage, the second optical waveguide 16C at the trailing stage, the first branching unit 12A, the second branching units 12B, the first multiplexing units 15B, and the second multiplexing unit 15C are in the amorphous state, the cores are set, for example, to have a refractive index of about 2.175 in the X, Y, and Z directions.

As an example of a process of forming the amorphous state and the non-amorphous state, $Ar^+$ ions are implanted from a surface of the thin film LN layer 33 while masking cores to be set to the non-amorphous state. By implanting the $Ar^+$ ions, the LN crystal orientation of cores of the thin film LN layer 33 is collapsed to remove the anisotropy of the light refractive index, thereby bring the cores into an amorphous state. Also, the masked cores remain in the non-amorphous state. As a result, the cores in the amorphous state have no angle at which an effective refractive index of signal light in the TE mode and an effective refractive index of unnecessary light in the TM mode coincide with each other, making it possible to suppress crosstalk.

In the optical modulator 5C according to the fourth embodiment, the cores of the two first optical waveguides 13A1 and the two first optical waveguides 13A2 on the forward path side at the leading stage, the two first optical waveguides 13C1 and the two first optical waveguides 13C2 on the backward path side at the leading stage, the two first optical waveguides 13D on the forward path side at the trailing stage are in a non-amorphous state. In addition, in the optical modulator 5C, the cores of the first optical waveguide 13E on the backward path side at the trailing stage, the input unit 11, and the output unit 17 are in an amorphous state. The cores in the amorphous state have no propagation angle at which an effective refractive index in the TE mode and an effective refractive index in the TM mode intersect. As a result, even when the optical modulator is formed of an IQ modulator, it is possible to facilitate improvements in modulating efficiency and coupling efficiency while suppressing crosstalk of the unnecessary TM mode with respect to the TE mode.

According to one aspect of an optical device or the like disclosed in the present application, improvements in modulating efficiency and coupling efficiency are facilitated while crosstalk is suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical device comprising:
an electro-optic crystal layer;

a first optical waveguide formed in the electro-optic crystal layer;
an electrode that applies an electric signal to the first optical waveguide; and
a second optical waveguide in an amorphous state formed in the electro-optic crystal layer and connected to the first optical waveguide.

2. The optical device according to claim 1, wherein
when the electro-optic crystal layer is an X-cut thin film LN layer, the second optical waveguide is
an optical waveguide other than an optical waveguide in which light propagates in a Y-axis direction of a crystal axis of the thin film LN layer.

3. The optical device according to claim 1, wherein
when the electro-optic crystal layer is a Y-cut thin film LN layer, the second optical waveguide is
an optical waveguide other than an optical waveguide in which light propagates in a X-axis direction of a crystal axis of the thin film LN layer.

4. The optical device according to claim 1, wherein the electro-optical crystal layer has a Pockel coefficient within a range of 10 to 2000 pm/V.

5. The optical device according to claim 1, wherein
at least a portion of a core of the second optical waveguide is
in the amorphous state, and
a core of the first optical waveguide is
in a non-amorphous state.

6. The optical device according to claim 1, further including:
an input unit that receives light;
a branching unit that branches the light from the input unit;
two first optical waveguides on a forward path side as the first optical waveguide branched at the branching unit;
an electrode that applies an electric signal to the two first optical waveguides on the forward path side;
a multiplexing unit connected to the two first optical waveguides on the forward path side to multiplex the light modulated by the two first optical waveguides on the forward path side according to the electric signal;
the second optical waveguide connected to the multiplexing unit to allow the modulated light multiplexed by the multiplexing unit to pass therethrough;
two first optical waveguides on a backward path side as the first optical waveguide connected to the second optical waveguide; and
an output unit that outputs the modulated light passing through the two first optical waveguides on the backward path side, wherein
at least a portion of a core of the second optical waveguide is
in the amorphous state, and
cores of the two first optical waveguides on the forward path side are
in a non-amorphous state.

7. The optical device according to claim 6, wherein
cores of the second optical waveguide, the branching unit, and the multiplexing unit are
in the amorphous state, and
cores of the two first optical waveguides on the forward path side, the two first optical waveguides on the backward path side, the input unit, and the output unit are
in the non-amorphous state.

8. The optical device according to claim 1, further including:
an input unit that receives light;
a branching unit that branches the light from the input unit;
two first optical waveguides on a forward path side as the first optical waveguide branched at the branching unit;
the second optical waveguide connected to the two first optical waveguides on the forward path side;
two first optical waveguides on a backward path side as the first optical waveguide connected to the second optical waveguide;
an electrode that applies to the two first optical waveguides on the forward path side and the two first optical waveguides on the backward path side;
a multiplexing unit that multiplexes the modulated light passing through the two first optical waveguides on the backward path side; and
an output unit that outputs the modulated light multiplexed by the multiplexing unit, wherein
at least a portion of a core of the second optical waveguide is
in the amorphous state, and
a core of the two first optical waveguides on the forward path side are
in the non-amorphous state.

9. The optical device according to claim 8, wherein
cores of the second optical waveguide, the branching unit, and the multiplexing unit are
in the amorphous state, and
cores of the two first optical waveguides on the forward path side, the two first optical waveguides on the backward path side, the input unit, and the output unit are
in the non-amorphous state.

10. The optical device according to claim 1, further including:
an input unit that receives light;
a branching unit that branches the light from the input unit;
two first optical waveguides on a forward path side as the first optical waveguide branched at the branching unit;
a first electrode that applies a first electric signal to the two first optical waveguides on the forward path side;
the second optical waveguide connected to the two first optical waveguides on the forward path side to allow the light modulated by the two first optical waveguides on the forward path side according to the first electric signal to pass therethrough;
two first optical waveguides on a backward path side as the first optical waveguide connected to the second optical waveguide;
a second electrode that applies a second electric signal to the two first optical waveguides on the backward path side;
a multiplexing unit connected to the two first optical waveguides on the backward path side to multiplex the light passing therethrough after being modulated by the two first optical waveguides on the backward path side according to the second electric signal; and
an output unit that outputs the modulated light multiplexed by the multiplexing unit, wherein
at least a portion of a core of the second optical waveguide is
in the amorphous state, and
a core of the two first optical waveguides on the forward path side and the two first optical waveguides on the backward path side are
in a non-amorphous state.

11. The optical device according to claim 10, wherein
cores of the second optical waveguide, the branching unit, and the multiplexing unit are
in the amorphous state, and
cores of the two first optical waveguides on the forward path side, the two first optical waveguides on the backward path side, the input unit, and the output unit are
in the non-amorphous state.

12. The optical device according to claim 1, further including:
an input unit that receives light;
a first branching unit that branches the light from the input unit;
a second branching unit that branches the light branched by the first branching unit;
two first optical waveguides on a forward path side at a leading stage as the first optical waveguide branched at the second branching unit;
a first electrode that applies a first electric signal to the two first optical waveguides on the forward path side at the leading stage;
a second optical waveguide at the leading stage as the second optical waveguide connected to the two first optical waveguides on the forward path side at the leading stage to allow the light modulated by the two first optical waveguides on the forward path side at the leading stage according to the first electric signal to pass therethrough;
two first optical waveguides on a backward path side at the leading stage as the first optical waveguide connected to the second optical waveguide at the leading stage;
a second electrode that applies a second electric signal to the two first optical waveguides on the backward path side at the leading stage;
a first multiplexing unit connected to the two first optical waveguides on the backward path side at the leading stage to multiplex the light passing therethrough after being modulated by the two first optical waveguides on the backward path side at the leading stage according to the second electric signal;
a second optical waveguide at a middle stage as the second optical waveguide connected to the first multiplexing unit to allow the light from the first multiplexing unit to pass therethrough;
two first optical waveguides on the forward path side at a trailing stage as the first optical waveguide connected to the second optical waveguide at the middle stage;
a third electrode that applies a third electric signal to the two first optical waveguides on the forward path side at the trailing stage;
a second multiplexing unit connected to the two first optical waveguides on the forward path side at the trailing stage to multiplex the light passing therethrough after being modulated by the two first optical waveguides on the forward path side at the trailing stage according to the third electric signal;
a second optical waveguide at the trailing stage as the second optical waveguide connected to the second multiplexing unit to allow the light from the second multiplexing unit to pass therethrough;
a first optical waveguide on the backward path side at the trailing stage as the first optical waveguide connected to the second optical waveguide at the trailing stage; and
an output unit connected to the first optical waveguide on the backward path side at the trailing stage to output the light from the first optical waveguide on the backward path side at the trailing stage, wherein
at least portions of cores of the second optical waveguide at the leading stage, the second optical waveguide at the middle stage, and the second optical waveguide at the trailing stage are
in the amorphous state, and
cores of the two first optical waveguides on the forward path side at the leading stage, the two first optical waveguides on the backward path side at the leading stage, and the two first optical waveguides on the forward path side at the trailing stage are
in a non-amorphous state.

13. The optical device according to claim 12, wherein
cores of the second optical waveguide at the leading stage, the second optical waveguide at the middle stage, the second optical waveguide at the trailing stage, the first branching unit, the second branching unit, the first multiplexing unit, and the second multiplexing unit are
in the amorphous state, and
cores of the two first optical waveguides on the forward path side at the leading stage, the two first optical waveguides on the backward path side at the leading stage, the two first optical waveguides on the forward path side at the trailing stage, the first optical waveguide on the backward path side at the trailing stage, the input unit, and the output unit are
in the non-amorphous state.

14. An optical communication apparatus comprising:
a processor that performs signal processing on an electric signal;
a light source that generates light;
an optical device modulating the light generated from the light source by using the electric signal output from the processor, wherein
the optical device includes:
an electro-optic crystal layer;
a first optical waveguide formed in the electro-optic crystal layer;
an electrode that applies an electric signal to the first optical waveguide; and
a second optical waveguide in an amorphous state formed in the electro-optic crystal layer and connected to the first optical waveguide.

* * * * *